United States Patent [19]

Klaschka et al.

[11] Patent Number: 4,514,788
[45] Date of Patent: Apr. 30, 1985

[54] COMPOSITE COVER PLATE AND APPLICATION OF THE SAME

[76] Inventors: Rudolf Klaschka, Tannenweg 9, D-7896 Wutoeschingen 3; Franz J. Wolf, Sprudelallee 19, D-6483 Bad Soden-Salmuenster, Fed. Rep. of Germany

[21] Appl. No.: 591,242

[22] Filed: Mar. 20, 1984

Related U.S. Application Data

[63] Continuation of Ser. No. 269,295, Jun. 1, 1981, abandoned.

[30] Foreign Application Priority Data

May 15, 1981 [EP] European Pat. Off. ........ 31103759.7

[51] Int. Cl.³ .......................... H01G 9/00; H01M 2/08
[52] U.S. Cl. ..................................... 361/433; 429/174; 429/175
[58] Field of Search ............... 361/433; 429/174, 175; 174/52 S, 17 VA; 29/570

[56] References Cited

U.S. PATENT DOCUMENTS 4,433,361  2/1984  Wolf et al. .................... 429/174

Primary Examiner—L. T. Hix
Assistant Examiner—Douglas S. Lee
Attorney, Agent, or Firm—Jordan and Hamburg

[57] ABSTRACT

The composite cover plate for the locking of compartments of electric components, especially for locking the metallic can compartment of an electric condenser consists of an aluminum disc sandwiched between a rubber coating applied on its one side and a disc of artificial material on its opposite side. The disc of artificial material is forced flush against the free surface of the aluminum disc by electric lead-through elements, especially lead-through rivet elements. The rubber coating is disposed around the outer edge of the aluminum disc extending up to a ring-shaped edge portions on the side of the aluminum disc on which the disc of artificial material lies. This ring-shaped rubber coating encloses the outer edge of the disc of artificial material in substantially definite form. Each lead-through rivet is secured against displacement through riveting on the bottom side of the disc of artificial material. Sealing of the lead-through rivet is effected in that the area provided on the head of the rivet is forced onto the surface of the rubber coating through the riveting process. The lead-through rivet is led through an opening in the aluminum disc whose diameter is larger than the diameter of the shaft of the lead-through rivet so that the lead-through element is insulated against the aluminum disc. A burstable valve is provided through a weakening of rubber coating over an opening in the aluminum disc and a coaxial opening in the disc of artificial material.

11 Claims, 4 Drawing Figures

COMPOSITE COVER PLATE AND APPLICATION OF THE SAME

This application is a continuation, of application Ser. No. 269,295, filed June 1, 1981 now abandoned.

BACKGROUND OF THE INVENTION

This invention relates to a composite cover plate for a compartment of electric components, especially for the metallic compartment of an electric condenser that is open on one side.

Cover plates for locking the compartment of an electric condenser are, for the most part, manufactured from artificial material in combination with rubber-elastic sealing elements. Such cover plates, however, can only be employed for temperatures up to 100° C. since the artificial material of the cover plate will become too soft at higher temperatures and then no longer have sufficient resistance to deformation. Moreover, the permeation consistency of the artificial cover is rapidly reduced at higher temperatures when gases or fluids are involved.

Such problems do not exist in cover plates which consist mainly of aluminum in association with rubber-elastic sealing elements. In such aluminum cover plates, however, problems arise in regard to electric insulation, this problem arising not only in regard to electric insulation as concerns the metallic cup compartment of the condenser but also as concerns electric extension working. By contrast, such electrical insulation problems do not arise for plates of artificial material.

In view of this situation, there have been made known a variety of cover plates consisting of a combination of rubber, artificial material and aluminum. None of the heretofore cover plates, however, solved in a satisfactory way the requirements expected from such cover plates.

In a not yet published application (PCT/EP No. 81/00011), there has been described a composite cover plate for the compartment of an electric component, especially for the metallic cup compartment of an electric condenser which is open on one side. One surface of this cover plate is, in substance, completely coated with rubber on one side as well on its outer edge, the opposite surface being coated with rubber in the edge or border area, e.g. the cover plate consisting overall of a rubberized aluminum disc and an artificial material disc and having tight electrical insulation resistant to the permeation of gas and fluids which can withstand elevated tension. The lead-through element extending into the inner area of the condenser is of one-piece and formed from the aluminum disc. The disc of artificial material lies on the rubberized surface of the aluminum disc. The surface of the aluminum disc which is rubberized only on the outer edges remains free to establish external connections. By a reinforcement formed on the lead-through element which acts as a locking element, the rubberized aluminum disc and the disc of artificial material form a strong composite, i.e. the compound cover plate, and are forced against each other in the direction of their normal area.

With this formation however, there is not solved the problem of how the plate may be provided with several electric lead-through element insulated against each other. Moreover, even the providing of safeguards in this plate against overloads is not entirely without problems.

SUMMARY OF THE INVENTION

This invention has as an object to create a composite cover plate of the aforementioned type which can provide for several electrical lead-through elements reliably insulated together against each other and on which a reliable safety valve to protect against excess pressure can be arranged without technical difficulty and considerable expense.

To solve this task, a composite cover plate has been created which is characterized in that a layer or disc of artificial material lies flatly against the non-rubberized surface of the aluminum disc and the outer edge of the disc of artificial material is enclosed in essentially definite form by the inner edge of the rubberized edge portions of the aluminum disc on this surface.

The composite cover plate can thus initially be characterized by the arrangement of the three layers of substances or plates of substances towards each other, e.g. by the sequence of substances rubber/aluminum/artificial material. In other words, the composite cover plate, in terms of the invention, may initially be characterized by the fact that the aluminum disc is sandwiched between the rubber layer and the disc of artificial material, wherein the rubber layer fully encircles the outer edge of the aluminum disc and encloses the outer edge of the disc of artificial material in an at least a conclusive manner. The aluminum disc, capable of conducting electricity, is thus on its two main surfaces, practically entirely covered with an electrically insulating substance, e.g. on one of its surfaces by an elastomer and on the opposite surface with a rigid, non-deformable artificial material.

In this composition of substances of the composite cover plate, the elastomer serves as well for impermeability as for electrical insulation of the electric lead-through connection elements in the plate, besides the electrical insulation of the disc against the cup compartment of the electric component.

The aluminum disc has the effect that the composite cover plate even at comparatively high temperatures, e.g. at temperatures in the range of over 125° C., remains entirely impermeable and non-deformable, and even under relatively high inner pressures in the enclosed cup compartment, i.e. which may be higher than 10 bar.

The disc of artificial material, finally, serves as electrical insulation not only of the electrical lead-through connection elements through the composite cover disc against each other, but also as electrical insulation of the composite cover plate in general in face of the electrical component assembled in the cup compartment, as for instance, the capacitative element of an electrical condenser.

For the rubberization of the aluminum disc, there are employed substances which have been known and have been used for that purpose, especially sulfur-free, cross linked synthetic elastomers. Preferably, there are used peroxide cross linked EPDM (ethylene-propylene-diene-terpolymerizate) or butyl rubber.

The middle disc or layer forming the metallic plate of the composite cover plate may, in principle, consist of a non-corrosive metal, but for reasons of electric characteristics as well as price and weight reasons, is practically always made from aluminum or an aluminum alloy. Therefore, this disc is succinctly referred to in the description as an "aluminum disc". Preferably, a substance is employed in its manufacture which consists of at least 99% aluminum.

The disc of artificial material of the composite cover plate can equally be manufactured from substances which have been known and in use for closing the compartments of electrical components. Such artificial materials should be non-deformable at high temperatures, they ought not be porous, and especially be non-corrosive, i.e. they must be completely inert against any and all components and substances to be locked inside the compartment, and in the case of condensers especially against fluid electrolytes and insulating oils. Preferably, such disc of artificial material is manufactured from polyamide, especially glass-fiber reinforced polyamide.

The electric lead-through element may be formed in one piece with the aluminum disc, when only one lead-through connection through the compound cover plate is to be provided. In this case the lead-through element may be provided with arresting protrusions over which the disc of artificial material may be pressed onto the aluminum disc with the formation of a snap connection. Alternately, the electric lead-through element formed in one piece with the aluminum disc, after attaching the disc of artificial material, may be deformed in the manner of a rivet so that the disc of artificial material may be forced onto the aluminum disc. Preferably, however, the lead-through element is forced as a separate rivet, whose head or head flange lies sealingly on the rubberized surface of the aluminum disc, whose shaft traverses through openings in the aluminum disc and the disc of artificial material, and whose foot is so riveted onto the free surface of the disc of artificial material that the disc of artificial material is forced onto the aluminum disc. The diameter of the traversing opening in the aluminum disc, through which the lead-through element passes, is larger than the diameter of the lead-through element, that is of the lead-through rivet respectively, that much larger that a reliable electrical insulation between the lead-through element and the aluminum disc is established. At the same time the diameter of the lead-through opening in the disc of artificial material has a dimension such that it may fittingly be traversed by the lead-through element.

For the improvement of electric insulation between the riveted or otherwise formed lead-through element as a separate unit and the aluminum disc, rubberization of the surface of the aluminum disc should preferably be drawn up to the edge of the lead-through opening. The backside of the aluminum disc can at least grab behind in sections for stabilization, for which purpose there is provided complementary grooves in the disc of artificial material which lies on this bare aluminum surface. The inner diameter of the lead-through opening when in the relaxed state let free from the rubber is especially somewhat smaller than the diameter of the lead-through element at this location so that the rubber coating during the insertion of the lead-through element during the assembly of the composite cover plate twists the elastomer in the lead-through opening minimally, wherein besides the electric insulation at the same time additional sealing between the lead-through element and the inner edge of the lead-through opening in the aluminum disc is accomplished. Despite this additional sealing effect, the sealing effect itself is achieved by the fact that the lead-through element with its supporting head area is forced tightly onto the elastomer layer over the wholly rubberized side of the aluminum disc. For this purpose, the contact area on the head of the lead-through element may additionally be formed with protruding sealing edges which turn within themselves and have been pressed into the elastomer layer.

In order to prevent in a simple way and without extra manufacturing costs, that the lead-through elements, especially on installation of electrical lines by means of screw connections, are twisted inside the lead-through openings, there are provided on the free surface of the disc of artificial material around the lead-through openings, least one groove but usually three grooves into which the foot of the lead-through element which in this form of execution of the invention has the form of a rivet, is firmly riveted or affixed by other appropriate means. At the same time, the surfaces of the aluminum disc and the artificial material disc lying over each other are maintained firmly in position by complementary protrusions and recesses which latch into each other in a conclusive way, preventing them from moving outside their contact points. In this way separately formed lead-through elements may be reliably ensured against displacement by torsion in their positions in the composite cover plate.

To reinforce the structure, corresponding recesses and protrusions which latch into each other in a decisive manner have also been provided between the surface of the aluminum disc and the elastomer layer or elastomer disc provided on that surface. In practice, such protrusions and/or recesses are formed on the surface of the aluminum disc which, in the first phase, is coated by extrusions with elastomer, wherein such coating is performed by known processes, especially by die-casting or molding. Alternately, the rubber layer may of course, be pre-manufactured separately and then be drawn as a finished part over the aluminum disc or be secured on.

The composite cover plate of this invention can, in principle, be provided with any desired known valve or valve-acting means which, when a predetermined critical limit of pressure in the interior of the compartment locked by the compound cover plate is exceeded, is opened. Preferably, the composite cover plate is, however, provided with a burstable membrane valve whose burstable membrane constitutes the rubber coating of the aluminum disc itself, that is, a weakened area of such rubber coating. For this purpose, a traverse opening has been provided in the aluminum disc which hereinafter will simply be designated by "valve opening". The valve opening is completely covered by the rubber coating and the elastomer layer is alternated or weakened in the area of the valve opening in order to allow opening of the burstable valve in the predetermined pressure range of 10 bar. Here the attenuation of the elastomer layer occurs in such a way that the free surface of the rubber coating of the compound cover plate remains unchangeably flat with the alternating part from the aluminum disc. In order to ensure that when over-pressure occurs from the side of the valve opening facing the aluminum disc, that the elastomer membrane does not tear away the whole rubber coating from the aluminum disc, the rubber coating is preferably drawn around the edge of the valve opening up to the flange-formed circle ring portion, and around the valve opening in the aluminum disc on the surface of the aluminum disc facing the disc of artificial material. Thus the disc of artificial material abutting the free aluminum surface has a complementary recess. In addition the surface of the recess in the disc of artificial material facing the circle ring-shaped rubber coating that grabs behind is preferably formed as a closed, encircling high edge which presses into the elastomer ring, thereby pressing the elastomer against the surface of the aluminum disc. The rubber coating is, in this way, drawn around the valve opening in the aluminum disc in an additionally tight and sealing manner. Withdrawal of the whole rubber coating from the surface of the aluminum disc is thereby excluded. Further, stabilization may be achieved in that a dome-shaped protrusion is formed on the disc of artificial material which extends into the weakening recess of the rubber coating up to the inside of the valve opening in the aluminum disc or through the same. Inside this dome-shaped protrusion with an equally tight-grabbing and clamping effect, there is provided a boring or opening which transverses the whole disc of artificial material which hereinafter will also be designated as a "valve opening". The valve opening provided in the disc of artificial material establishes a connection between the burstable valve membrane and the inside of the compartment locked by this cover plate. The valve opening in the disc of artificial material is arranged coaxially to the valve opening in the aluminum disc being, however, provided with a substantially smaller cross-section than the valve opening of the aluminum disc.

Independently from the formation of a valve in the composite cover plate, the composite cover plate preferably is used in such a way that upon proper use of the composite cover plate to lock a compartment, the disc of artificial material will face the inside of the locked compartment. This arrangement is preferred, because, as a rule, artificial materials, as a rule, in face of the corrosive substances that are employed especially in condensers, show clearly greater resistance to corrosion than the known elastomers.

The invention is described below in more detail by way of an example in combination with drawings.

DESCRIPTION OF THE PREFERRED EMBODIMENTS

Figure 1:
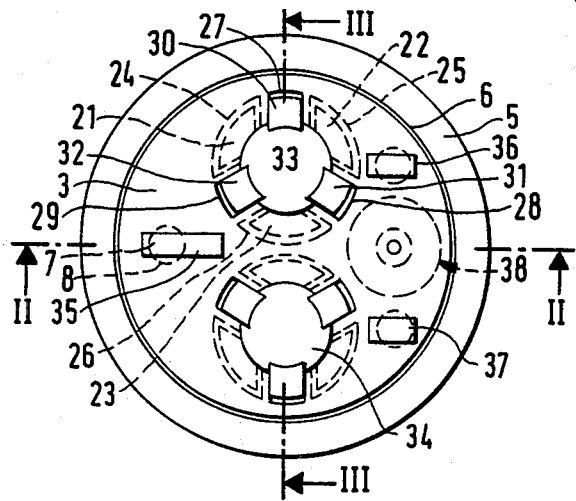
FIG. 1 is an example of an embodiment of the composite cover plate viewed from the bottom, meaning a top view of the artificial material disc.
Figure 2:
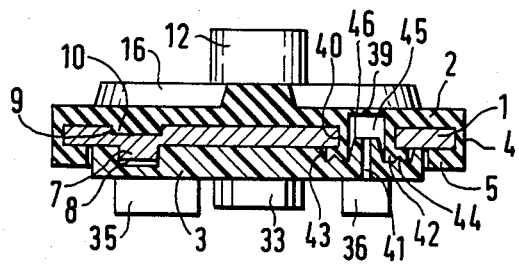
FIG. 2 is a sectional view taken along II—II in FIG. 1.
Figure 3:
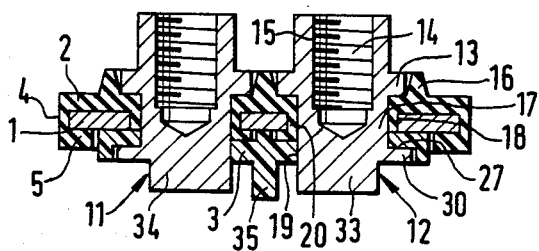
FIG. 3 is a sectional view taken along III—III of FIG. 1.
Figure 4:
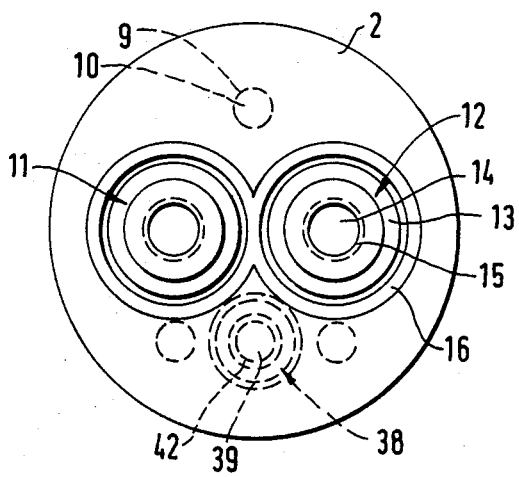
FIG. 4 is an example of the embodiment of FIG. 1, showing a top view of the elastomer layer.

The composite plate cover shown in FIGS. 1 to 4 consists of an aluminum disc 1 which is arranged between an elastomer layer 2 and a disc 3 of artificial material. The elastomer layer 2 is vulcanized onto the aluminum disc 1 by rubber coating the aluminum disc through an injection molding process. The elastomer layer 2 grips with an edge portion 4 over the outer edge of aluminum disc 1 and extends itself up to a ring-shaped edge portion 5 on the lower face of aluminum disc 1 as shown in FIGS. 2 and 3. The disc of artificial material 3 is disposed with its upper face flushly adjacent to the lower side of aluminum disc 1 as shown in FIGS. 2 and 3. The outer portion 6 of the disc of artificial material 3 is, in substance encircled by the ring-formed portion 5 of the rubber coating of the aluminum disc (FIG. 1).

On the lower side of the aluminum disc 1, there are provided three pin-type portions 7 which lockingly grip into corresponding cylindrical recesses 8 provided on the upper face of the disc of artificial material 3. In correspondence therewith, there are provided recesses 9 on the upper face of the aluminum disc which are wholly filled with the elastomer 2 into which grip-type portions 10 of the rubber coating 2 of the aluminum disc 1 are accommodated.

The composite cover plate is provided with two identically formed lead through elements that are insulated against each other and against the aluminum disc, the lead-through elements 11, 12 being identically formed so that in the following paragraphs only one of these two lead-through elements will be described.

The lead-through element 12 is formed as a rivet. The head of rivet 12 is formed with an outer flange 13 which lies on the surface of the elastomer layer 2. Moreover, the head of the lead-through rivet 12 is mainly cylindrical in shape, having a blind bore 14 in which an inner thread 15 has been provided for connection purposes. The outer edge of head flange 13 is flushly encircled by a raised collar 16 which is formed as one piece with the elastomer 2. This encircling collar or edge 16 serves to provide electric insulation of the lead-through elements 11 and 12 against each other.

The shaft 17 of the lead-through rivet 12 passes through a lead-through opening 18 in the aluminum disc 1 and through a lead-through opening 19 in the disc of artificial material 3. The diameter of the lead-through opening 18 is substantially larger than the diameter of the rivet shaft 17 at this location, while the diameter of rivet shaft 19 has a dimension such that the lead-through opening 19, in snug fit, encircles the shaft 17 of the lead-through element 12. The rubber coating 2 of the aluminum disc 1 extends in conjunction with portion 20 around the inner edge of lead-through opening 18 to the bottom side of aluminum disc 1. On the lower side of aluminum disc 1, however, the rubber coating does not form a complete circle ring, but merely three sectional edge portions 21, 22, 23, which are arranged in corresponding recesses 24, 25, 26 in the upper side of the disc of artificial material so that the surface of the disc of artificial material 3, despite the injecting of the rubber coating on the remaining portions, lies flatly adjacent to the bottom part of the aluminum disc.

At the same angle distance from each other, there are formed three recesses 27, 28, 29 around the lead-through opening 19 in the disc of artificial material 3, into which sections 30, 31 and 32 of rivet foot 33 of the lead-through rivet 12 are latchingly and conclusively held down. By this form of attachment, on the one hand, the lower side of head flange 13 of lead-through rivet 12 is sealingly forced onto the upper side of elastomer layer 2 and, on the other hand, at the same time, the lead-through rivet 12 is fully ensured at insertion against displacement of the electrical connections in thread 15.

The lower face of riveting foot 33 of the lead-through rivet 12 as well as correspondingly of the riveting foot 34 of the lead-through rivet 11 are at disposal for soldering connections with the electrical element inside the compartment locked by the composite cover plate. Protrusions 35, 36, 37 on the bottom part of the disc of artificial material 3 serve as electrically insulating distancers to the electrical element in the compartment.

The composite cover plate has, further, an over-pressure safety valve in the form of a burstable membrane valve 38. A weakened portion of elastomer layer 2 is disposed over a valve opening 40 in aluminum disc 1 and a coaxially arranged valve opening 41 in the disc of artificial material 3 serve as the burstable membrane 39. The rubber coating 2 is completely disposed around the inner edge of valve opening 40 in aluminum disc 1 up to the opposite lower side of aluminum disc 1 where the rubber coating in the edge portion surrounding valve opening 40 forms a circle-ringed section 42. This edge portion 42 lies in a recess 43 in the disc of artificial material 3. The surface of recess 43 directed upwardly and facing elastomer ring 42 has a closed surrounding raised edge 44 which is pressed into elastomer ring 42 and holds it in position. A dome-shaped protrusion 46 of the disc of artificial material 3, in which valve opening 41 is formed, extends into the weakening formed by the cylindrical recess 45 in rubber coating 2. The dome-shaped protrusion 46 forces the rubber coating 2, 42 against the edge of valve opening 40 in the aluminum disc 1 and contributes to the stabilization of the burstable valve. This fixation of rubber coating 2 ensures that the membrane 39 in the event of excess pressure on the bottom part of the cover plate tears open at reproduceable values.

The example of the embodiment of a composite cover plate illustrated in FIGS. 1 to 4 can be used in electrolyte condensers up to temperatures in the range of approximately 140° to 150° C.

Especially FIG. 1, but also FIG. 3, show that the recesses 24, 25, 26 on the upper side of the disc of artificial material 3 intended to receive the rubberized sections 21, 22, 23 and the recesses 27, 28, 29 on the bottom side of the disc of artificial material 3 intended to receive the riveted parts 30, 31, 32 of foot 33 of the lead-through rivet 12 are staggered in relation to each other, and are thus assembled in relation to each other at angles such that they will not overlap when they are projected perpendicularly.

We claim:

1. Composite cover plate for an electric component comprising an aluminum disc, said aluminum disc having an outer edge, said aluminum disc having a first side and a second side, a rubber covering on said first side of said aluminum disc, said rubber covering having a peripheral portion extending around said outer edge and partially onto said second side of said aluminum disc, an artificial material disc on said second side of said aluminum disc, said artificial material disc being resistant to gas and fluid permeation, at least one lead-through element extending through the composite cover plate, said lead-through element having a first flange means disposed against said rubber covering and a second flange means disposed against said artificial material disc, said artificial material disc, said aluminum disc and said rubber covering each having an opening through which said lead-through element passes such that said lead-through element with said first and second flange means function as a rivet holding said rubber covering, said aluminum disc, and said artificial material disc together, said aluminum disc being provided on said first side with one or more first protrusion-recess means which fit snugly into complementary first recess-protrusion means in the adjoining surface of said rubber covering, said aluminum disc also being provided on said second side with one or more second recess-protrusion means which fit lockingly into engagement with complementary second protrusion-recess means in the adjoining surface of said rubber covering, whereby said first and second protrusion-recess means and said first and second recess-protrusion means prevent torsional displacement between said aluminum disc, said artificial material disc and said artificial material disc, said second flange means comprising one or more first flange segments, and one or more complementary first recess segments in said artificial material disc element for receiving said one or more first flange segments, whereby said one or more first flange segments and said one or more recess segments prevent torsional displacement of said lead-through element.

2. Composite cover plate according to claim 1 wherein said opening in said aluminum disc is larger than the size of said lead-through element passing therethrough, said rubber covering having an integral portion extending into the space between said lead-through element and said opening in said aluminum disc.

3. Composite cover plate according to claim 2 wherein said rubber covering has a plurality of extending segments extending from said integral portion onto said second side of said aluminum disc, said artificial material disc having a plurality of recess segments receiving said extending segments.

4. Composite cover plate according to claim 1 wherein the size of said opening in said artificial material disc is substantially the same as the size of the portion of the lead-through element passing therethrough such that said lead-through element fits snugly in said opening in said artificial material disc.

5. Composite cover plate according to claim 1 wherein said lead-through element has a threaded portion for threadedly connecting an electrical line.

6. Composite cover plate according to claim 1 wherein said rubber covering has a plurality of second extending segments extending on to said second side of said aluminum disc, said artificial material disc having a plurality of second recess segments receiving said second extending segments, said one or more first flange segments of said second flange means comprising a plurality of spaced first flange segments, said one or more first recess segments in said artificial material disc comprising a plurality of spaced first recess segments.

7. Composite cover plate according to claim 6 wherein said first and second recess segments in said artificial material disc are on opposite sides of the artificial material disc and are annularly spaced around the lead-through opening without overlap.

8. Composite cover plate according to claim 7 wherein all of said segments extend generally radially from said lead-through element and from the opening for said lead-through element with each individual segment of each group of segments being equally angularly spaced from one another.

9. Composite cover plate according to claim 1 wherein said rubber covering is provided with a raised integral rim disposed around said lead-through element.

10. Composite cover plate according to claim 1 further comprising a burstable valve means which comprises means defining a valve opening in said aluminum disc, said rubber covering having a weakened portion generally aligned with said valve opening, said rubber covering extending around the border of said valve opening in said aluminum disc and having an extending portion passing integrally onto said second side of said aluminum disc, said artificial material disc having a recess for receiving said extending portion of said rubber covering, said recess having an encircling ring which sealingly engages a mating encircling ring in said extending portion of said rubber covering, said artificial material disc having means defining an opening generally aligned with said valve opening in said aluminum disc, said opening in said artificial disc having a cross sectional area less than the cross sectional area of said valve opening in said aluminum disc.

11. Composite cover plate according to claim 1 wherein said synthetic polymer material disc is disposed such that when the composite cover is in place on a compartment to be covered, the synthetic polymer material disc will face the inside of the compartment.

* * * * *